US012762502B2

(12) United States Patent
Mroczek

(10) Patent No.: US 12,762,502 B2
(45) Date of Patent: Oct. 13, 2026

(54) SUPPLY CHAIN TRACKING AND DELIVERY SYSTEM AND METHOD

(71) Applicant: Kenneth Mroczek, New York, NY (US)

(72) Inventor: Kenneth Mroczek, New York, NY (US)

( * ) Notice: Subject to any disclaimer, the term of this patent is extended or adjusted under 35 U.S.C. 154(b) by 0 days.

(21) Appl. No.: 19/361,459

(22) Filed: Oct. 17, 2025

(65) Prior Publication Data

US 2026/0057336 A1 Feb. 26, 2026

Related U.S. Application Data

(63) Continuation of application No. PCT/US2024/062266, filed on Dec. 30, 2024.

(60) Provisional application No. 63/668,405, filed on Jul. 8, 2024, provisional application No. 63/666,445, filed on Jul. 1, 2024, provisional application No. 63/572,432, filed on Apr. 1, 2024.

(51) Int. Cl.

| | |
|---|---|
| ***G06Q 10/0832*** | (2023.01) |
| ***G06F 16/22*** | (2019.01) |
| ***G06Q 10/087*** | (2023.01) |
| ***H04L 67/12*** | (2022.01) |

(52) U.S. Cl.
CPC ..... *G06Q 10/0832* (2013.01); *G06F 16/2255* (2019.01); *G06Q 10/08776* (2025.08); *H04L 67/12* (2013.01); *G06Q 2220/00* (2013.01)

(58) Field of Classification Search
CPC ........... G06Q 10/0832; G06Q 10/0833; G06Q 10/0835; G06Q 10/0841; G06Q 10/0877
See application file for complete search history.

(56) References Cited

U.S. PATENT DOCUMENTS 12,272,439 B1 4/2025 Soon-Shiong
2018/0232693 A1* 8/2018 Gillen ................ G06Q 10/0834
2019/0285603 A1* 9/2019 Velez ..................... G06Q 10/04
(Continued)

FOREIGN PATENT DOCUMENTS

EP 4609337 9/2025
WO 2025198851 9/2025

OTHER PUBLICATIONS

Patent Cooperation Treaty (PCT), International Search Report and Written Opinion for Application PCT/US2024/062266 filed Dec. 30, 2024, mailed Mar. 3, 2025, International Searching Authority, US.

*Primary Examiner* — A. Hunter Wilder
(74) *Attorney, Agent, or Firm* — McDonald Hopkins LLC

(57) ABSTRACT

A system that monitors supply chain inventory includes at least one computing device that receives sensor data from a sensor apparatus on a transport, where the sensor data indicates real-time information associated with a cargo on the transport. The at least one computing device also encrypts the sensor data on a blockchain ledger, or stores the sensor data in a hash table. The at least one computing device also maintains a database of stored credentials associated with the sensor data or information associated with the sensor data. The at least one computing device also receives entered credentials from a user interface, and indicates the sensor data or information associated with the sensor data through the user interface based on the entered credentials matching at least one of the stored credentials.

25 Claims, 4 Drawing Sheets

(56) References Cited

U.S. PATENT DOCUMENTS

| | | | |
|---|---|---|---|
| 2019/0361917 | A1 | 11/2019 | Tran et al. |
| 2020/0311666 | A1* | 10/2020 | Gray .................. G06Q 10/0832 |
| 2021/0198033 | A1* | 7/2021 | Oggianu ................ B65D 88/74 |
| 2022/0111699 | A1 | 4/2022 | Hofsdal |
| 2022/0194403 | A1 | 6/2022 | McFarland, Jr. et al. |
| 2025/0265581 | A1 | 8/2025 | Schoof et al. |
| 2025/0267018 | A1 | 8/2025 | Pandiyath Velayudhan et al. |
| 2025/0272995 | A1 | 8/2025 | Leonessa et al. |
| 2025/0278731 | A1 | 9/2025 | Lei et al. |
| 2025/0292201 | A1 | 9/2025 | Yoo et al. |
| 2025/0299136 | A1 | 9/2025 | Maluchnik |
| 2025/0301317 | A1 | 9/2025 | Li et al. |

* cited by examiner

SUPPLY CHAIN TRACKING AND DELIVERY SYSTEM AND METHOD

CROSS-REFERENCE TO RELATED APPLICATION

This application is a continuation of International Application No. PCT/US2024/062266 entitled, "BLOCKCHAIN AND IOT MONITORING OF TRANSFUSION MEDICINE SUPPLY CHAIN AND STORAGE," filed on Dec. 30, 2024 which claims priority to U.S. Provisional Patent Application No. 63/668,405 entitled, "BLOCKCHAIN AND IOT MONITORING OF TRANSFUSION MEDICINE SUPPLY CHAIN AND STORAGE," filed on Jul. 8, 2024, U.S. Provisional Patent Application No. 63/666,445 entitled, "SYSTEMS AND METHODS OF MEDICAL SUPPLY CHAIN LOGISTICS," filed on Jul. 1, 2024, and U.S. Provisional Patent Application No. 63/572,432 entitled, "ORTHOPEDIC GRAFT AND ORTHOBIOLOGIC TRANSPORTATION MONITORING AND TRACKING," filed on Apr. 1, 2024, which are incorporated herein by reference in its entirety.

TECHNICAL FIELD

The present disclosure generally relates to systems and methods of supply chain inventory management, including cargo procurement, transport, storage, and inventory logistics. More particularly, the disclosure relates to systems and methods for integrating real-time sensor data with smart contracts, blockchain ledgers, and a user interface that is secure and accessible.

BACKGROUND

In modern supply chain systems, the ability to monitor real-time conditions of cargo during transit or storage is critical to maintaining product quality, ensuring regulatory compliance, and optimizing operational efficiency. This is especially important for sensitive goods such as perishable food items, medical goods such as pharmaceuticals, orthopedic grafts, or orthobiologics, and other chemicals, which require specific environmental conditions, such as temperature control in a cold chain or a cool chain, or monitoring of potential chemical changes. A cold chain is a temperature-controlled supply chain. Current systems often lack the capability to provide continuous, real-time data of a cold chain or a cool chain, leading to potential spoilage, safety risks, or failure to meet regulatory standards.

In particular, healthcare cargo procurement, transport, storage, and inventory logistics can be technically demanding and complex, fast paced, and dynamic as compared to conventional tracking systems. The infrastructure organized to support these processes is often referred to as a supply chain or more particularly a healthcare supply chain. Historically, monitoring and safeguarding of healthcare cargo during transport and/or storage along the healthcare supply chain has presented challenges stemming from inadequacies of conventional tracking systems when applied to healthcare cargo. Failures or inefficiencies along the supply chain negatively affect patient care and outcomes due to damage to healthcare cargo, or lack of availability to healthcare practitioners at the time the cargo is needed for patient care. The efficacy of medical therapies and modalities relies heavily on an efficient supply chain that maintains unique and often stringent storage requirements of healthcare cargo along the supply chain. Healthcare cargo can include therapeutics including medications, pharmaceuticals and biopharmaceuticals, infusion medicines, orthobiologics, and orthopedic grafts for transplant into human or animal patients such as autografts, xenografts, allografts. Inefficiencies in the supply chain can dramatically and negatively affect the practice of medicine in general and reduce the efficacy and potency of healthcare cargo, or the success or functioning of healthcare cargo after implantation or introduction into the body.

In this regard, traditional supply chains lack transparency to healthcare practitioners, stakeholders, transportations companies, insurers, and other inventory specialists or users, making it difficult to ensure accountability and traceability of the healthcare cargo throughout the supply chain and during storage or inventory at healthcare facilities. Effective healthcare cargo supply chain management and healthcare cargo storage is crucial for maintaining the integrity of medications, pharmaceuticals biopharmaceuticals, orthopedic grafts, and orthobiologics as any lapse in monitoring or handling may compromise the quality and effectiveness of the healthcare cargo. Healthcare cargo can also include medical goods, cancer medications, autoimmune medications, antibiotics, pharmaceuticals, orthopedic grafts, orthobiologics, and biopharmaceuticals encompass a diverse range of substances, each with unique characteristics and requirements for preservation, transport, and storage.

Healthcare supply chains are often opaque to healthcare professionals, to deleterious effect including barriers to scheduling patient care and shortage of medical goods at the time a patient is present for or needs treatment. For example, infusion therapy, which involves the administration, infusion, or continuous introduction of solutions of medications, pharmaceuticals, or biopharmaceuticals directly into a patient's bloodstream, requires precise timing of the supply chain in order to effectuate treatments for cancer, autoimmune conditions, infectious diseases and other conditions that require maintained sources of pharmaceuticals and biopharmaceuticals. The efficacy of infusion therapy relies heavily on the integrity and viability of the medications, pharmaceuticals, and biopharmaceuticals being administered. As such, maintenance of cargo storage conditions such as temperature and humidity at all steps of the supply chain is required for maintaining the efficacy of healthcare cargo.

Orthopedic graft transplants, including autografts, xenografts, and allografts, represent another aspect of healthcare cargo that make patient treatment for a variety of orthopedic conditions possible. Orthopedic grafts and orthobiologics encompass a diverse range of tissues including, for example, bone, cartilage, ligaments, tendons, fascia, skin, adipose tissue, and amniotic membranes, each with unique characteristics and requirements for preservation from production through storage and transport and finally to use in patients. The efficacy of these procedures heavily relies on controlled transport and/or storage and preservation of orthopedic grafts before transplant. Orthopedic grafts, orthobiologics can become unusable if exposed to a temperature or humidity outside of an acceptable range.

Infusion therapy offers significant advantages over other medical treatments by enabling direct delivery of medications, nutrients, or fluids into a patient bloodstream, bypassing the digestive system for rapid and efficient absorption. This method ensures precise dosing, enhances bioavailability, and is particularly effective for patients with severe illnesses, chronic conditions, or those unable to tolerate other medications. Infusion therapy also allows for the administration of drugs that are unstable or ineffective through other means, such as certain biologics, chemotherapeutics, or antibiotics. Versatility of infusion therapy technologies support a wide range of medical treatments, from hydration and pain management to immune therapy, with the added benefit of controlled, continuous delivery in outpatient or home care settings, reducing hospital stays and improving patient outcomes. Similar to orthobiologics, however, many infusion therapy treatments can become unusable if exposed to a temperature or humidity outside of an acceptable range.

SUMMARY

The following presents a summary of this disclosure to provide a basic understanding of some aspects. This summary is intended to neither identify key or critical elements nor define any limitations of embodiments or claims.

According to one aspect, a system includes at least one computing device that monitors supply chain inventory. The at least one computing device receives sensor data from a sensor apparatus on a transport. The sensor data indicates real-time information associated with cargo on the transport. The at least one computing device encrypts the sensor data on a blockchain ledger, and maintains a database of stored credentials associated with the encrypted sensor data or information associated with the encrypted sensor data. The at least one computing device also receives entered credentials from a user interface, and indicates the encrypted sensor data or information associated with the encrypted sensor data through the user interface based on the entered credentials matching at least one of the stored credentials.

According to another aspect, a method of tracking a cargo in a supply change using a system includes transmitting sensor data to at least one computing device from a sensor apparatus on a transport, and encrypting the sensor data on a blockchain ledger. The method also includes maintaining a database of stored credentials associated with the encrypted sensor data or information associated with the encrypted sensor data, and receiving entered credentials from a user interface. The method further includes indicating the encrypted sensor data or information associated with the encrypted sensor data through the user interface based on the entered credentials matching at least one of the stored credentials.

According to another aspect, a non-transitory computer-readable medium stores instructions that, when executed by at least one computing device, causes the processor in the at least one computing device to perform a method. The method includes receiving sensor data from a sensor apparatus on a transport, and encrypting the sensor data on a blockchain ledger. The method also includes maintaining a database of stored credentials associated with the encrypted sensor data or information associated with the encrypted sensor data. The method also includes receiving entered credentials from a user interface, and indicating the encrypted sensor data or information associated with the encrypted sensor data through the user interface based on the entered credentials matching at least one of the stored credentials.

The foregoing and other features are hereinafter more fully described below. In this regard, the following description sets forth in detail certain illustrative embodiments that are indicative of but a few of the various ways in which the principles of the subject disclosure may be employed.

DETAILED DESCRIPTION

Figure 1:
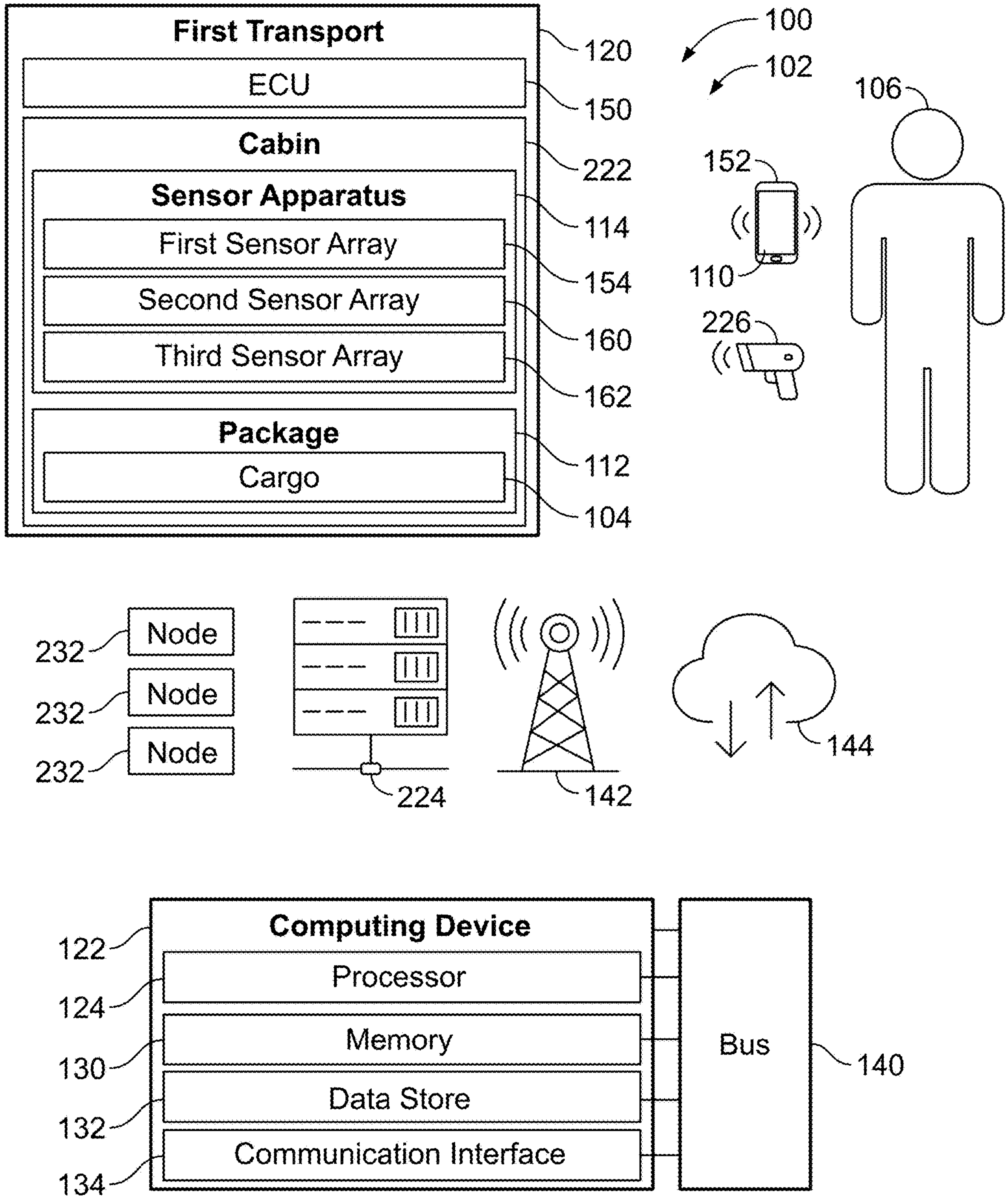
FIG. 1 is an exemplary operating environment of an inventory monitoring system for tracking and managing cargo as part of a supply chain.

The systems and methods disclosed herein are configured to perform inventory tracking and management with respect to cargo and associated transports as part of a supply chain. The inventory tracking and management may include remotely determining conditions of the cargo in transit or storage along the supply chain over a period of time, and selectively indicating aspects of the cargo, including the recorded conditions of the cargo to a variety of remote users. The inventory tracking and management may also include executing smart contracts associated with the cargo, and routing cargo in transit or storage based on a status of the smart contract. The inventory tracking and management may also include automatically generating real-time alerts to remote users based on a determined condition of the cargo, a status of an associated smart contract, and an assigned destination along the supply chain.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Computer communication," as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a low-powered wide-area network (LPWAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

"Computer readable media," as used herein, includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"User" as used herein may be a biological being, such as humans (e.g., adults, children, infants, etc.).

System Overview

It should be understood that the description and drawings herein are merely illustrative and that various modifications and changes can be made in the structures disclosed without departing from the present disclosure. Referring now to the drawings, wherein like numerals refer to like parts throughout the several views, FIG. 1 depicts an operating environment 100 in which a monitoring system 102 tracks and manages supply chain inventory. In this regard, the monitoring system 102 generates, collects, and encrypts supply chain inventory information associated with cargo 104 that is part of a supply chain. The monitoring system 102 also grants selective access to supply chain data, including various aspects of the supply chain inventory information, to a user 106 via a user interface 110 that may be supported on a portable device, described in greater detail below.

As shown in FIG. 1, the monitoring system 102 includes a package 112 that contains the cargo 104, and a sensor apparatus 114 that produces sensor data indicating a condition of the cargo 104. The monitoring system 102 further includes a first transport 120 that delivers the cargo 104, contained in the package 112, from a departure point toward a destination point.

In the depicted embodiment, the package 112 is a refrigerated container that directly contains the cargo 104 such that a refrigerated interior environment defined by the package 112 directly contacts the cargo 104. The package 112 includes a refrigeration system independent from the first transport 120, and operated through a relay switch by the computing device 122 described in greater detail below.

While, as depicted, the package 112 is a refrigerated container, the package 112 may additionally or alternatively include an insulated container, a cryogenic container, a hazardous material container, a dry bulk container, or a tank container that directly contain the cargo 104 to maintain or affect conditions of the cargo 104 in storage and in transit on the first transport 120. Also, the cargo 104 may additionally include intermediate packaging such as vials, boxes, ampoules, intravenous (IV) bags, blister packs, chemical canisters, biological sample tubes, sterile medical trays or kits, or cryovials that directly contact the interior environment of the package 112 without departing from the scope of the present disclosure.

As described in greater detail below, the sensor apparatus 114 may include a variety of sensors provided directly on each of the cargo 104, the package 112, and the first transport 120 to detect a condition associated with the cargo 104. With this construction, the monitoring system 102 is configured to detect a variety of conditions associated with maintaining or affecting the cargo 104.

The monitoring system 102 includes a computing device 122 remote from the first transport 120. The sensor apparatus 114 transmits the sensor data associated with the cargo 104 to the computing device 122 in transit or storage. As such, the computing device 122 may remain stationary while the cargo 104 is in transit or storage on the first transport 120.

With continued reference to FIG. 1, the computing device 122 includes a processor 124, a memory 130, a data store 132, and a communication interface 134 that may be interconnected by a bus 140. In this manner, the bus 140 may be a Controller Area Network (CAN) or a Local Interconnect Network (LIN) protocol bus that operably connects components of the computing device 122 in computer communication to transfer data between components of the computing device 122. The various components of the computing device 122 may additionally or alternatively provide wireless computer communications utilizing various protocols to send and receive electronic signals internally to and from components of the operating environment 100. In an embodiment, the components of the computing device 122 or the first transport 120 communicate with each other through a low-powered wide area network (LPWAN), which may be operated locally at the computing device 122 or the first transport 120. With this construction, the components of the computing device 122 and the first transport 120 may communicate securely over relatively large distances with low power consumption.

The computing device 122 receives the sensor data transmitted wirelessly from the sensor apparatus 114 via a network 142. The network 142 may include cell towers, satellites, and hard line communication systems to perform various functions that facilitate components of the monitoring system 102. The computing device 122 may further perform computer communication with a cloud computing platform 144 via the network 142. The computing device 122 may be on the first transport 120 with the cargo 104 and the sensor apparatus 114, or remote from the first transport 120, where the computing device 122 is operably connected to the first transport 120 via a network 142. The sensor data may be transmitted wirelessly by the computing device 122 or directly from the sensor apparatus 114 via the network 142 for downstream user 106 access.

The first transport 120 includes an electronic control unit (ECU) 150 that relays the sensor data transmitted to the computing device 122 from the sensor apparatus 114. In this regard, the ECU 150 includes at least computer supported on the first transport 120, where the ECU 150 performs various functions associated with the first transport 120, receives the sensor data transmitted from the sensor apparatus 114, and then transmits the sensor data to the computing device 122 directly or via the network 142. The at least one computer included in the ECU 150 has a processor, a memory, a data store, a communication interface, and a bus that include similar features and function in a similar manner as the processor 124, the memory 130, the data store 132, the communication interface 134, and the bus 140 for receiving, processing, and transmitting information, and executing instructions in the monitoring system 102. In view of this further description is omitted for the sake of brevity.

Referring to FIG. 1, in an embodiment, the computing device 122 and the sensor apparatus 114 or the ECU 150 communicate the sensor data through an encryption scheme. In such an embodiment, the sensor apparatus 114 or the ECU 150 may encrypt the sensor data into an unreadable ciphertext, and transmit the ciphertext to the computing device 122 as the sensor data. In such an embodiment, the computing device 122 stores and applies a decryption key to the sensor data transmitted from the sensor apparatus 114 or the ECU 150 to convert the ciphertext back into its original, readable form. With this construction, the sensor apparatus 114 or the ECU 150 may communicate the sensor data to the computing device 122 with relative security. In further embodiments, the encryption scheme may additionally or alternatively include a symmetric encryption scheme, an asymmetric encryption scheme, a hybrid encryption scheme, an end-to-end encryption scheme, or wireless encryption protocols to facilitate relatively secure wireless communication between components of the monitoring system 102 including the sensor apparatus 114, the ECU 150, and the computing device 122.

With continued reference to FIG. 1, the computing device 122 selectively communicates supply chain inventory information, including the sensor data, with the user 106 through the user interface 110. Supply chain inventory information may additionally or alternatively include contractual information indicating whether the cargo 104 is available for exclusive assignment to an end user, a current route of the first transport 120, a past route of the first transport 120, and identification of the first transport 120 or an entity associated with the first transport 120 such as an operator, management company, or country of origin.

The user interface 110 is supported on a terminal 152 operated by the user 106, where the user interface 110 receives input information from the user 106, and communicates output information from the computing device 122 based on the input information. While, in the depicted embodiment, the terminal 152 is a portable device such as a smartphone, the terminal 152 may additionally or alternatively include a variety of portable or stationary electronic devices that support the user interface 110 without departing from the scope of the present disclosure. In this manner, the user interface 110 provides the user 106 access to the supply chain inventory information.

With continued reference to FIG. 1, the sensor apparatus 114 includes a first sensor array 154 located directly on or within the cargo 104, a second sensor array 160 located directly on or within the package 112, and a third sensor array located directly on or within the first transport 120. The first sensor array 154, the second sensor array 160, and the third sensor array 162 are configured to detect conditions associated with the cargo 104, including direct conditions of the cargo 104 such as moisture content, and indirect conditions of the cargo 104 such as a temperature of the first transport 120. While, as depicted, the monitoring system 102 includes each of the first sensor array 154, the second sensor array 160, and the third sensor array 162 for detecting conditions associated with the cargo 104, the sensor apparatus 114 may include more or fewer sensor arrays provided on or within the cargo 104, the package 112, and the first transport 120 without departing from the scope of the present disclosure.

Figure 2:
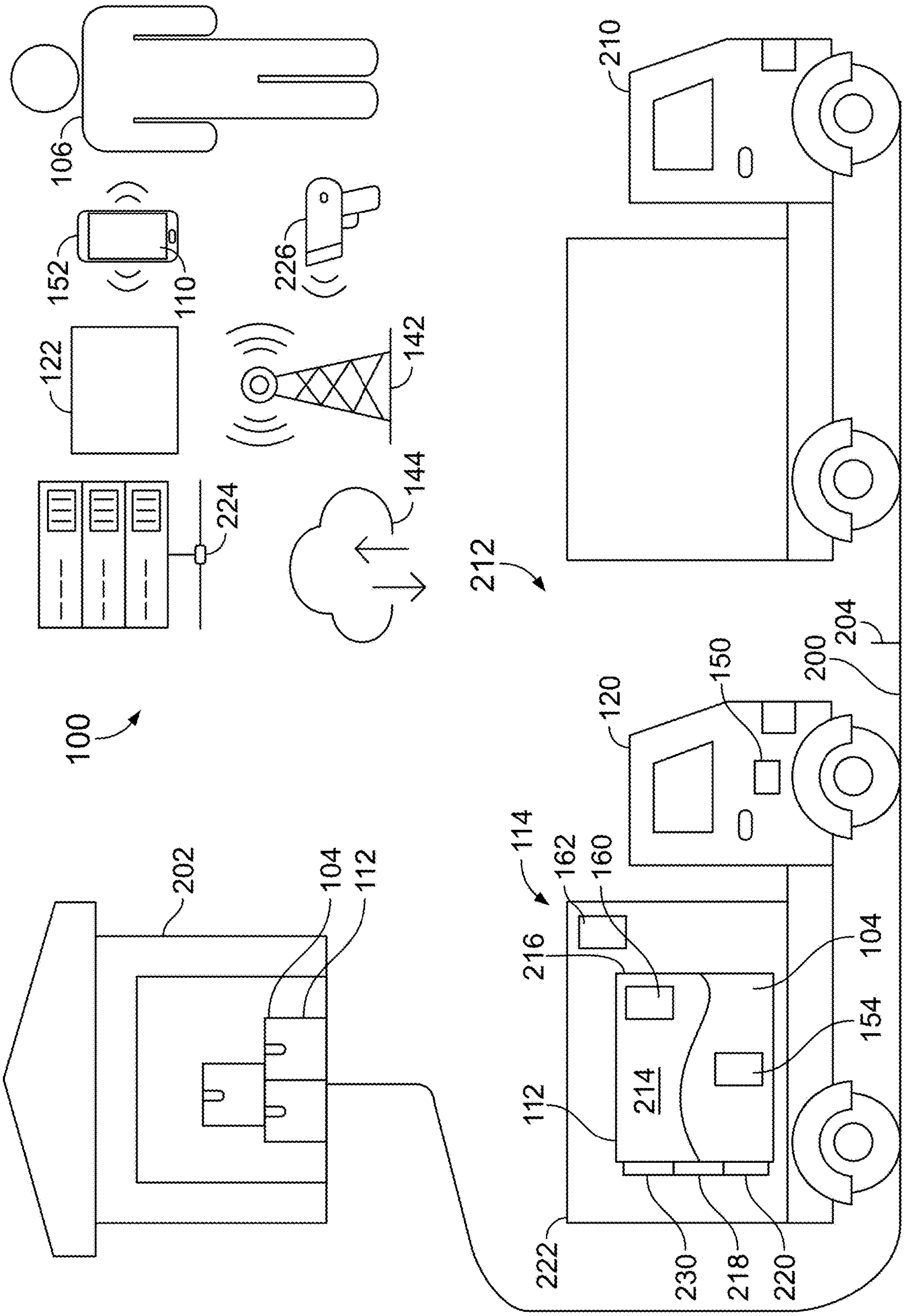
FIG. 2 is a diagram of the monitoring system.

FIG. 2 depicts an embodiment of the monitoring system 102 where the first transport 120 is a ground vehicle, such as a delivery truck. The first transport 120 may additionally or alternatively include a variety of vehicles that transport or store the cargo 104 with or without the package 112, such as an automobile, a drone, a semi-trailer truck, a ship, a boat, a train, a helicopter, or an airplane. In this regard, a combination of a variety of vehicles may be employed along various segments of a route 200 taken by the first transport 120 between a departure point 202 and a predetermined destination point 204. Further, the first transport 120 may transfer the cargo 104 to a second transport 210 at the predetermined destination point 204, where the second transport 210 continues transit or storage of the cargo 104 in the supply chain.

The departure point 202 may be a place of origin of the cargo 104, or an intermediate location along the route 200 where the first transport 120 received the cargo 104. In the depicted embodiment, the departure point 202 is a warehouse that initially stores the cargo 104, including the packages 112.

The predetermined destination point 204 is a presently assigned location where transit or storage of the cargo 104 by the first transport 120 is to be completed. The predetermined destination point 204 may be a final delivery location of the cargo 104 to an end user, such as the user 106, or may be an intermediate location along the route 200 where the cargo 104 is transferred from the first transport 120 to the second transport 210. The second transport 210 includes similar features and functions in a similar manner as the first transport 120 for delivering and monitoring the cargo 104 along the route 200, further description of which will be omitted for the sake of brevity.

With continued reference to FIG. 2, a heading of the first transport 120 is a direction the first transport 120 is presently moving along the route 200 from the departure point 202 toward the predetermined destination point 204. The heading of the first transport 120 may be detected by the sensor apparatus 114, for example, with a GPS sensor included in the third sensor array 162. The sensor apparatus 114 transmits the sensor data indicating the heading of the first transport 120 to the computing device 122 in real-time. In this manner, the sensor apparatus 114 provides real-time heading data of the first transport 120, including the cargo 104 and the package 112, to the computing device 122, where the sensor data may be accessible to the user 106.

As described above, the computing device 122 receives the sensor data transmitted from the sensor apparatus 114 as real-time condition information associated with the cargo 104. In the depicted embodiment, the sensor apparatus 114 transmits the sensor data to the computing device 122 in a continuous data signal. With this construction, the sensor apparatus 114 may transmit relatively large amounts of real-time data as the sensor data to the computing device 122 with minimal delays caused by processing tasks performed local to the first transport 120.

The sensor apparatus 114 may additionally or alternatively communicate the sensor data with the computing device 122 at set time intervals. In such an embodiment, the sensor apparatus 114 may employ set time intervals to verify a quality of the streamed real-time data. In an alternative embodiment, the sensor apparatus 114 may rely on transmitting the sensor data at set time intervals. With this construction, the sensor apparatus 114 transmits the sensor data as real-time information while conserving available communication resources between the first transport 120 and the computing device 122.

In an alternative embodiment, the sensor apparatus 114 or the ECU 150 may limit transmission of the sensor data to the computing device 122 to circumstances of the first transport 120, where at least one sensor included in the sensor apparatus 114 detects a condition that exceeds a predetermined threshold. With this construction, computational resources otherwise required by the computing device 122 to monitor conditions associated with the cargo 104 may be decentralized and distributed from the computing device 122 to the first transport 120. Notably, an overall amount of the computational resources decentralized and distributed from the computing device 122 may be increased with every vehicle incorporated along the route 200, including the second transport 210. In this regard, where the first transport 120 and the second transport 210 form a plurality of transports 212 that may include more or fewer vehicles as transports or points of storage in the supply chain, where each of the plurality of transports 212 may perform processing functions decentralized and distributed from the computing device 122 using respective ECUs, such as the ECU 150.

With continued reference to FIG. 2, the cargo 104 is contained within the package 112 with at least one sensor included in the second sensor array 160. Notably, the second sensor array 160 may include a sensor disposed in the package 112 so as to occupy and directly contact the interior environment 214 of the package 112 with the cargo 104. The second sensor array 160 may additionally or alternatively include a sensor embedded within the package 112, such as a wall 216 forming the package 112, where the sensor is positioned outside the cargo 104.

The package 112 includes the refrigeration system 218 disposed within the wall 216, operably connected to the computing device 122 through the relay switch 220. The second sensor array 160 generates the sensor data indicating conditions of the interior environment of the package 112, and the computing device actuates the relay switch 220 to operate the refrigeration system 218 based on the sensor data. In an embodiment, the wall 216 forms a double-walled structure defining an interstitial space between inner and outer walls that receive coolant from the refrigeration system 218. The inner wall of the wall 216 is thermally conductive as compared to the outer wall to ensure efficient heat transfer, enabling the coolant to efficiently maintain the interior environment of the package 112 at a desired temperature. In an embodiment, the coolant is a refrigerant that circulates the refrigeration system 218.

The computing device 122 may actuate the refrigeration system 218 automatically, and independently from the first transport 120 based on the sensor data from the sensor apparatus 114, including the second sensor array 160. In this regard, the refrigeration system 218 and the relay switch 220 are self-contained within the package 112, including the wall 216. More specifically, the refrigeration system 218 maintains circulating coolant and a standalone power supply, such as a battery, that maintain the desired temperature of the interior environment of the package 112 without requiring resources from the first transport 120. In an embodiment, the relay switch 220 is accessible from an exterior surface of the package 112, where an operator on the first transport 120 may manually actuate the relay switch 220 to trigger or halt the refrigeration system 218. In a further embodiment, the operator on the first transport 120 may manually override the relay switch 220 actuated by the computing device 122.

The computing device 122 executes a control algorithm to actuate the relay switch 220, causing the refrigeration system 218 to trigger or halt the coolant injection as needed to maintain the desired temperature. In an embodiment, the relay switch 220 is by default in an OFF configuration that does not consume power from the package 112, and is actuated toward an ON configuration by the computing device 122 to maintain the desired temperature of the interior environment. With this construction, the monitoring system 102 provides a dynamic control system that controls the interior environment of the package 112 based on the sensor data without excessive energy usage or coolant waste, even in environments with fluctuating external temperatures. The computing device 122 may determine the desired temperature of the package 112 based on a smart contract associated with the cargo 104, or a predetermined condition of the cargo 104. In this regard, for example, the desired temperature may include a range of temperatures for maintaining an integrity of the cargo 104 in the package 112, and the desired temperature may change over time based on conditions of an associated smart contract.

In an embodiment, the computing device 122 generates an alarm at the terminal 152 when the computing device 122 actuates the relay switch 220. In this manner, the computing device 122 alerts the user 106 when the computing device 122 engages or disengages the refrigeration system 218 via the relay switch 220 to maintain the desired temperature. With this construction, the monitoring system 102 provides an automated and independent alarm system that enables awareness by the user 106 that the cargo 104 may be at risk, or that the cargo 104 may be consuming more resources in transit or storage than intended.

The predetermined condition of the cargo 104 may be set before or without executing a smart contract, such as at the departure point 202 or the place of origin of the cargo 104. Also, the predetermined condition may be set in accordance with industry standard practices for maintaining the cargo 104. For example, where the cargo 104 includes a medication to be maintained at a storage temperature in the package 112, the computing device 122 may set the predetermined condition in accordance with standards published by the Centers for Disease Control and Prevention, or standards published by an associated manufacturer. The predetermined condition may additionally or alternatively be directly, manually set by a manufacturer or stakeholder of the cargo 104, an operator of the package 112, or an operator of the transport 120.

The computing device 122 transmits the sensor data to the terminal 152, where the sensor data is communicated to the user 106 through the user interface 110. The user 106 may also operate the refrigeration system 218 through the terminal 152, optionally based on the sensor data received at the terminal 152 from the computing device 122. With this construction, the monitoring system 102 enables real-time oversight by manual operators such as the user 106 to ensure integrity of the cargo 104, including when the cargo 104 is in transit or storage along the route 200.

The package 112, cargo 104, and the sensor apparatus 114 are stored within a cabin 222 of the first transport 120 during transit or storage along the route 200. The cabin 222 may also be a hold, a trailer, a compartment, a cabinet, or similar storage area that accommodates the package 112 and corresponds to a type of vehicle employed as the first transport 120. In the depicted exemplary embodiment where the first transport 120 is a delivery truck, the cabin 222 is a cargo compartment forming part of the delivery truck.

The monitoring system 102 is configured to manage smart contracts associated with the cargo 104, optionally while the cargo 104 is in transit or storage on the first transport 120. In this regard, the terminal 152 may transmit a smart contract from the user 106 to the computing device 122, where the computing device 122 executes the smart contract based on the sensor data.

With continued reference to FIG. 2, the computing device 122 may additionally or alternatively receive a smart contract from a remote server 224 via the network 142. In this manner, the monitoring system 102 may receive and process a plurality of smart contracts respectively received from a plurality of users, including the user 106, at the computing device 122. The smart contracts stored at the computing device 122 may also be assigned to the cargo 104, or executed in association with the cargo 104 in a predetermined manner as the cargo 104 becomes part of the supply chain.

Such smart contracts may include data collection or reporting requirements for associated sensor data generated by the sensor apparatus 114. In this regard, the smart contracts may require that the computing device 122 collect specific modalities, channels, or types of the sensor data from the sensor apparatus 114. The modalities, channels, or types of data the computing device 122 collects from the sensor apparatus 114 may include, for example, temperature data and location data over distinct data communication channels.

The smart contracts may also require that the computing device 122 transmit the collected sensor data to a remote computer, such as the terminal 152, via the network 142. In this manner, when the computing device 122 executes a smart contract, the executed smart contract may cause the computing device 122 to report specified sensor data to the user 106. In an embodiment, the monitoring system 102 performs constant pass through reporting of the sensor data for conditions of the cargo 104 to the user 106 based on parameters and reporting requirements defined in an associated smart contract. In this regard, the smart contract may define a detected temperature of the cargo 104 as a parameter, and define a minimum frequency for transmitting the sensor data to the terminal 152 as a reporting requirement. With this construction, the monitoring system 102 prioritizes computer communication resources to output of the sensor apparatus 114 for interested users, stakeholders, manufacturers, insurers, and others based on an executed smart contract. The computing device 122 may additionally or alternatively generate an alert to the user 206 when the sensor data transmitted from the sensor apparatus 114 and associated with the cargo 104 exceeds a threshold, is outside a predetermined range, or indicates an anomaly.

Such smart contracts may additionally or alternatively include conditions of purchase or sale of the cargo 104. In this regard, the computing device 122 receives the sensor data transmitted from the sensor apparatus 114, and determines conformance between the sensor data associated with the cargo 104 and the conditions of purchase or sale. In an embodiment, the computing device 122 automatically executes a smart contract upon determining that the cargo 104 conforms to the conditions in the smart contract based on the sensor data from the sensor apparatus 114. With this construction, the computing device 122 may automatically execute smart contract transactions controlling the cargo 104, while the cargo 104 is in transit or storage along the route 200, based on sensor data from the sensor apparatus 114.

The computing device 122 receives, stores, and encrypts smart contracts from the plurality of users, including the user 106. In an embodiment, the computing device 122 encrypts the smart contracts on a blockchain ledger with the sensor data received from the sensor apparatus 114, described in greater detail below. With this construction, the terminal 152 and the remote server 224 may communicate the plurality of smart contracts to the computing device 122 with relative security.

Smart contracts received at the computing device 122 may contain, indicate, or be associated with conditions or acceptable ranges of conditions associated with the cargo 104 in transit or storage along the route 200. In an embodiment, the computing device 122 receives a smart contract indicating an acceptable temperature range as a condition associated with the cargo 104. In this regard, the computing device 122 records the sensor data from the sensor apparatus 114, and verifies the detected real-time conditions associated with the cargo 104 against the associated conditions stipulated in smart contracts.

The computing device 122 may execute or decline smart contract agreements based on whether the detected real-time conditions associated with the cargo 104 meet associated conditions defined in the smart contracts. In an embodiment where a smart contract stored in the computing device 122 stipulates that an associated condition of the cargo 104 shall be within an acceptable range, the computing device 122 may execute the smart contract where the associated condition of the cargo 104 meets the conditions of the smart contract, and repeatedly check the sensor data from the sensor apparatus 114 against the associated condition or a predetermined condition.

The computing device 122 declines smart contract agreements where the detected real-time conditions associated with the cargo 104 do not meet the associated conditions of the smart contracts. In this regard, the computing device 122 may transmit a notification to an associated terminal, such as the terminal 152, when the computing device 122 determines that the smart contract is not acceptable based on the real-time conditions associated with the cargo 104, and will not be executed. In this manner, the computing device 122 automatically accepts or declines smart contract agreements directed to the cargo 104, without manual operation by a user such as the user 106.

The computing device 122 may adjust a set time interval at which the sensor apparatus 114 transmits the sensor data based on the detected real-time conditions associated with the cargo 104. In an embodiment, computing device 122 shortens the set time interval when at least one of the detected real-time conditions deviates from a predetermined condition or the associated conditions stipulated in the smart contract. More specifically, upon executing a smart contract, the computing device 122 repeatedly checks the sensor data against the predetermined condition or the associated conditions required by the smart contract in a continuous manner.

In further embodiments, the computing device 122 may additionally or alternatively shorten the set time interval when the at least one detected real-time condition indicates an anomaly, approaches a threshold, or approaches bounds of a range that is a predetermined condition or an associated condition stipulated in the smart contract. In this regard, as the computing device 122 continuously checks the sensor data, the computing device 122 may determine an instance in the detected real-time conditions that occurs rarely in transit or storage, and may be identified as a statistical anomaly in the sensor data. For example, the computing device 122 may determine a detected temperature of the cargo 104 in transit or storage indicates a distinct change over time that is atypical for the package 112 as a refrigerated container, so as to indicate a statistical anomaly.

In the embodiments, the computing device 122 may maintain the shortened set time interval for a remainder of transit or storage, or maintain the shortened set time interval for a predetermined period of time after the detected anomaly. In this manner, the computing device 122 may prioritize data communication resources in the monitoring system 102 to monitor the cargo 104 through the sensor apparatus 114. The computing device 122 may transmit an alarm to the terminal 152 indicating occurrence of the detected anomaly, a total deviation of the detected anomaly, or the adjusted set time interval. In this manner, the monitoring system 102 provides an automated alarm system to participating entities such as the user 106 through the terminal 152.

In an embodiment, the computing device 122 maintains the smart contract as the sensor data indicates conformance to the smart contract, and terminates the smart contract upon determining a breach of an associated condition by at least one of the detected real-time conditions of the cargo 104. In this regard, the computing device 122 may execute a built-in termination logic of the smart contract, such as a self-destruct function, based on the determined breach. The computing device 122 may additionally or alternatively execute a burn mechanism which destroys tokens associated with the smart contract, rendering the smart contract ineffective by making the tokens unusable. The computing device 122 may additionally or alternatively execute a blockchain specific mechanism for contract termination, such as allowing resource limited-contracts to automatically deactivate based on the detected breach.

With continued reference to FIG. 2, the user 106 may access the supply chain inventory data, including the sensor data via the user interface 110. In this regard, the terminal 152 is in computer communication with the computing device 122 through the network 142, where the terminal accesses and communicate the supply chain inventory data to the user 106 through the user interface 110, based on a level of access assigned to the user 106 through the terminal 152. Notably, the supply chain information communicated by the terminal 152 to the user 106 may include stored data that is updated intermittently at the computing device 122 or the terminal 152, or real-time data that is continuously streamed from the computing device 122 to the terminal 152.

The computing device 122 may execute smart contracts governing the cargo 104 while the cargo 104 is in transit or storage along the route 200. In this regard, the smart contracts executed by the computing device 122 may alter the route 200, including the predetermined destination point. With this construction, for example, a shipment of the cargo 104 may be initially headed from a point of origin on the first transport 120 without a determined buyer, where the computing device 122 avails the user 106 of the cargo 104 in the supply chain inventory information. In such an embodiment, the user 106 may access the supply chain inventory information of the cargo 104 as a potential buyer, where the user 106 accesses condition and location information of the cargo 104. The computing device 122 generates and transmits updated delivery information to the first transport 120, at the ECU 150 through the network 142. The updated delivery information may include the route 200 augmented to change the predetermined destination point 204 in accordance with the executed smart contract. In this manner, the computing device 122 causes the first transport 120 to change or reset course based on the sensor data received from the sensor apparatus 114.

In another example, when the computing device 122 determines that the sensor data transmitted from the sensor apparatus 114 deviates from a condition required by a smart contract governing the cargo 104, the computing device 122 causes the first transport 120 to change or reset the route 200 to an updated predetermined destination point associated with another smart contract executed by the computing device 122, a location associated with the departure point 202, or a location associated with a point of disposal of the cargo 104. As such, the first transport 120 heading change may accord with updated transit information for the route 200, directing the cargo 104 to the departure point 202 or a different location while in transit or storage to the initial predetermined destination point 204. The different location may be required by the smart contract executed in connection with the initial predetermined destination point 204, required by a smart contract subsequently executed by the computing device 122, or determined by an entity associated with the departure point 202.

With continued reference to FIG. 2, during transit or storage of the cargo 104 to the predetermined destination, the computing device 122 repeatedly checks the sensor data transmitted from the sensor apparatus 114 against a condition provided in the smart contract. Where the computing device 122 determines the sensor data conforms to the condition provided in the smart contract, the first transport 120 continues to the predetermined destination point 204.

The predetermined destination point 204 may be a final destination point of the cargo 104 along the route 200 or an intermediate point where the cargo 104 is transferred from the first transport 120 to the second transport 210 or a storage facility that is a connecting point for the second transport 210. The monitoring system 102 includes a handheld scanner 226 that may be used to scan the package 112, the cargo 104, or one of the plurality of transports 212 and generates scanned information. The scanner 226 may be operated by the user 106 at the predetermined destination point 204. In alternative embodiments, the scanner 226 may be actuated by an operator of one of the plurality of transports 212, or by an independent entity at the predetermined destination point 204. The scanner 226 transmits the scanned information to the computing device 122 via the network 142, where the computing device 122 verifies the sensor data against the scanned information, or generates an alarm or alert indicating the scanned information through the user interface 110 or a remote server 224.

In an embodiment, the package 112 includes an exterior identifier 230, such as a Quick Response (QR) code, a barcode, a serial number, or other identifier unique to the package 112. The exterior identifier 230 on the package 112 links the scanner 226 in operable communication with the sensor apparatus 114 and stored sensor data in the monitoring system 102. In an embodiment, the exterior identifier 230 links the scanner 226 to the sensor apparatus 114, the computing device 122, or the stored sensor data in the monitoring system 102 using a transaction hash, a blockchain address, a smart contract address or identifier, or a decentralized and distributed storage hash. With this construction, the monitoring system 102 may distinguish the cargo 104 from objects foreign to the package 112, including counterfeit goods.

The exterior identifier 230 may also include identifying information of the cargo 104, such as a name of the cargo, for example a drug name. The identifying information on the exterior identifier 230 may additionally or alternatively indicate a batch number or a unique identifier associated with manufacture, transport, or storage of the cargo 104. In an embodiment, the exterior identifier 230 includes a hologram, color shifting ink, a watermark, a tamper-evident seal, microtext or nanotext, a deoxyribonucleic acid (DNA) sequence tag, a ultraviolet (UV) or infrared marking, a digital watermark, or guilloches as a part of the unique identifier. The exterior identifier 230 may additionally or alternatively include a radio frequency identification (RFID) tag, a custom label or sticker, or a near-field communication (NFC) chip as a part of the unique identifier.

With this construction, the exterior identifier 230 includes visual elements that are unique to the cargo 104 in the package 112, and are relatively difficult to reproduce as compared to the package 112. In this manner, the exterior identifier 230, including the unique identifier, deters potential attempts of counterfeit or fraud involving the cargo 104.

In an embodiment, the exterior identifier 230 indicates or is associated with expiration information of the cargo 104, such as a predicted expiration date, stored or accessed by the computing device 122 or the scanner 226. In this regard, the scanner 226 may transmit the scanned information, including information of the exterior identifier 230, to the computing device 122 via the network 142, where the computing device 122 verifies scanned information against stored information, or generates an alarm or alert indicating the scanned information through the user interface 110 or a remote server 224.

More specifically, the computing device 122 may generate an alarm at the terminal 152 when the predicted expiration date has passed, enabling the user 106 to avoid assigning or using the cargo 104. The computing device 122 may additionally or alternatively generate the alarm a predetermined amount of time before the expiration data passes, enabling the user 106 to prioritize assigning or using the cargo 104 before the expiration date. With this construction, in an embodiment where the cargo 104 is stored with a plurality of otherwise similar objects having a variety of expiration dates, the cargo 104 may be rotated with the plurality of similar objects based on the variety of expiration dates. In this manner, the user 106 may maintain relatively even, extended expiration dates among similar objects stored during a same time as the cargo 104, minimizing waste of goods in the monitoring system 102.

As depicted, the monitoring system 102 includes a plurality of transports 212, including the first transport 120 and the second transport 210. The computing device 122 receives the sensor data from the sensor apparatus 114, optionally from each of the first sensor array 154, the second sensor array 160, and the third sensor array 162 as provided on the first transport 120. Each transport among the plurality of transports 212 includes a sensor configuration that has similar features and functions in a similar manner as the sensor apparatus 114 for detecting conditions of the cargo 104, further description of which will be omitted for the sake of brevity. In this manner, the plurality of transports 212 may each transmit the sensor data to the computing device 122 while the cargo 104 is in transit or storage along the route 200, where the computing device 122 may encrypt, store, process, and transmit the sensor data.

The computing device 122 encrypts the sensor data from the sensor apparatus 114 on the blockchain ledger, where the stored credentials are individually associated with portions of the encrypted sensor data or information associated with the encrypted sensor data such that different entered credentials provide different access privileges to the encrypted sensor data or information associated with the encrypted sensor data. With this construction, the user 106 may have a variety of access privileges based on associated credentials. The portions of data indicate locations of a plurality of cargo 104 among the plurality of transports 212 relative to a selected location, an origin, a condition, a quantity, or a type of the cargo, a transport identification, whether the cargo 104 among the plurality of transports 212 has been associated with an executed smart contract, or a condition entered at the user interface 110.

The sensor apparatus 114 is fixed to the package 112 or within the interior environment 214 of the package 112 with the cargo 104, and the computing device 122 receives information indicating a condition inside the interior environment 214 from the sensor apparatus 114 as the sensor data. In other embodiments, the sensor apparatus 114 is in direct or nearly direct contact with the cargo 104, where the sensor apparatus 114 generates the sensor data transmitted to the computing device 122.

Referring back to FIG. 1, in an embodiment, the computing device 122 encrypts the sensor data on a blockchain ledger, and the computing device 122 distributes the blockchain ledger to a plurality of nodes 232. In this manner, the blockchain ledger employed by the monitoring system 102 is decentralized based on the distribution among the plurality of nodes 232. The plurality of nodes 232 are stationary relative to the first transport 120 in transit or storage along the route 200. In the blockchain ledger, the sensor data is encrypted using a public key infrastructure (PKI) system.

In an embodiment, each user with access to the monitoring system 102, including the user 106, has a public key and a private key. The public key is used to encrypt the data, while the private key is used to decrypt the data. This ensures that only authorized users with the private key can access the sensor data. Once the computing device 122 encrypts the sensor data, the computing device 122 adds the encrypted sensor data to the blockchain ledger as a block. The block is then verified over the network 142 or plurality of nodes 232 in the blockchain, ensuring that the sensor data is accurate and has not been tampered with. Once the block is verified, the block is added to the chain of blocks, creating an immutable record of the sensor data and providing a high level of security. The blockchain ledger also ensures that the sensor data is protected from tampering.

The plurality of nodes 232 is a group of individual computing devices such as computers, servers, or other networked devices that perform computer communication with each other and the computing device 122 over the network 142. In an embodiment, the plurality of nodes 232 are supported on the remote server 224. The plurality of nodes 232 maintain copies of the blockchain ledger distributed by the computing device 122, validate transactions, the sensor data, and other supply chain inventory information associated with the cargo 104, and perform consensus participation in updating the blockchain ledger. The plurality of nodes 232 may include full nodes which store a complete copy of the blockchain ledger and validate transactions governing the cargo 104, lightweight nodes that store a subset of data, and rely on full nodes for information verification, and mining nodes that add new blocks to the blockchain ledger.

The computing device 122 may function as a central node among the plurality of nodes 232 to maintain and process the blockchain ledger in a centralized manner. As such, the monitoring system 102 may function on a centralized blockchain system that offers increased efficiency, control, and scalability relative to a decentralized and distributed blockchain system that does not provide the computing device 122 with a single authority over the plurality of nodes 232. With the computing device 122 functioning as the central node to the plurality of nodes 232, transaction validation and ledger updates occur in a relatively coordinated and streamlined manner. This centralized control by the computing device 122 over the plurality of nodes 232 simplifies consensus mechanisms, reducing the computational resources and time required to process transactions. Additionally, the computing device 122 as the central authority can implement consistent protocols, ensure uniform data integrity, and adapt to system requirements more easily.

Alternatively, the computing device 122 may function as a decentralized node, as distributed among the plurality of nodes 232. In this regard, the computing device 122 operates on a distributed network with the plurality of nodes 232, where no one of the nodes 232 or the computing device 122 is capable of full control over the blockchain. More specifically, the computing device 122 and the plurality of nodes 232 may function as a distributed ledger technology (DLT) that ensures agreement among nodes regarding transaction validity through Proof of Work or Proof of Stake functions.

In an embodiment, the computing device 122 and the plurality of nodes 232 employ a distributed hash table (DHT) that stores data as key-value pairs, where the key is derived from a hash function, and the value contains the corresponding data. In this manner, the computing device 122 and the plurality of nodes 232 may maintain their own local data chain and achieve increased network integrity through the DHT.

As such, the monitoring system 102 may additionally or alternatively function on a decentralized and distributed blockchain or hash table system that offers relative transparency and neutrality between participating entities such as the user 106. Notably, the network 142 may support the plurality of nodes 232 independently from each other, such that the plurality of nodes 232 are less vulnerable to hacking as compared to a single point of failure.

In an embodiment, the cargo 104 is a medication, a pharmaceutical, a biopharmaceutical, an orthopedic graft such as an allograft, a xenograft, or an autograft, blood, plasma, or an orthobiologic material. In such an embodiment, the sensor apparatus 114 generates real-time information that indicates a direct condition of the cargo 104, or indicates a condition of an environment, such as the interior environment 214 of the package 112 in direct contact with the cargo 104. In such an embodiment, the generated information indicates a position, a temperature, and a humidity of the cargo 104 in the environment.

More specifically, the sensor apparatus 114 may include a global positioning satellite (GPS) sensor that generates real-time position information associated with the cargo 104 or the first transport 120 when in transit, storage, or otherwise stationary. With this construction, sensor apparatus 114 generates real-time position information associated with the cargo 104 as part of the sensor data.

The sensor apparatus 114 may additionally or alternatively include a temperature sensor that generates real-time temperature information associated with the cargo 104. With this construction, the sensor apparatus 114 generates real-time temperature information associated with the cargo 104 as part of the sensor data.

The sensor apparatus 114 may additionally or alternatively include a hygrometer that generates real-time humidity information associated with the cargo 104. With this construction, the sensor apparatus 114 generates the real-time humidity information associated with the cargo 104 as the sensor data.

The sensor apparatus 114 may additionally or alternatively include an accelerometer that generates real-time acceleration information associated with the cargo 104. With this construction, the sensor apparatus 114 generates real-time acceleration information associated with the cargo 104 as the sensor data.

The sensor apparatus 114 may additionally or alternatively include a light sensor that generates real-time light intensity information associated with the cargo 104. With this construction, the sensor apparatus 114 generates real-time light intensity information as the sensor data.

The sensor apparatus 114 may additionally or alternatively include a tilt detector that generates real-time orientation information associated with the cargo 104. With this construction, the sensor apparatus 114 generates real-time orientation information associated with the cargo as the sensor data.

The sensor apparatus 114 may contain an electronic lock that generates real-time status information associated with packaging containing the cargo 104. With this construction, the sensor apparatus 114 generates real-time status information of the package 112 containing the cargo 104, such as whether the package 112 is or has been opened since leaving the departure point 202, as the sensor data.

The computing device 122 provides each of the plurality of users, including the user 106, a set of credentials for accessing the supply chain inventory information from a user interface, such as the user interface 110. In this regard, the computing device 122 maintains a database of stored credentials associated with each of the plurality of users and the sensor data or information associated with the sensor data. The stored credentials assigned to the plurality of users are associated with a variety of levels of access based on the individual user and a privilege to access the supply chain inventory information. With this construction, the monitoring system 102 may facilitate cooperation between users representing a variety of stakeholders in the supply chain including manufacturers, transport operators, carriers, warehousing entities, and dealers or end line consumers associated with the cargo 104 under a tailored information sharing scheme that engages disparate stakeholders in a relatively secure manner by limiting which stakeholders have access to what supply chain inventory information. Further, each user in the plurality of users, including the user 106, may provide additional information, such as identification information, location information, payment information, or personal information to the monitoring system 102 with limited access to other users in the plurality of users.

The computing device 122 receives entered credentials from the user 106 through the user interface 110. In this regard, the terminal 152 transmits the entered credentials from the user interface 110 to the computing device 122 via the network 142. In an embodiment, the entered credentials may be automatically provided by the terminal 152, as operated by the user 106.

The user interface 110, supported on the terminal 152, may perform wireless computer communication with the computing device 122 via the network 142. With this construction, the user interface 110 may be stationary or traveling separately as compared to the first transport 120 during transit or storage. As such, the plurality of users including user 106 may be remote from the cargo 104 in transit or storage while accessing real-time condition information of the cargo 104.

The computing device 122 may indicate the sensor data or information associated with the sensor data through the user interface 110 based on the entered credentials matching at least one of the stored credentials. In this regard, the computing device 122 actuates the terminal 152 to communicate information through the user interface 110. The terminal 152 may include a variety of elements that engage the user 106 in communicating supply chain inventory information from the computing device 122. For example, referring back to FIG. 1, the user interface 110 may include a speaker that outputs audio information indicating the supply chain inventory information to the user 106. The user interface 110 may additionally or alternatively include a display such as a touch screen, a heads-up display, an augmented or virtual reality display, or a projector that outputs visual information indicating the supply chain inventory information to the user 106. The user interface 110 may additionally or alternatively include indicator lights, such as light emitting diodes (LEDs) that output visual information indicating the supply chain inventory information to the user 106. The user interface 110 may additionally or alternatively include haptic feedback devices that may be part of a wearable device, where the haptic feedback devices output vibrations, force feedback, or text information such as braille indicating the supply chain inventory information to the user 106.

In an embodiment, the computing device 122 supports an automated alarm system that engages the user 106 based on the sensor data. In this regard, the computing device 122 may transmit a notification to the terminal 152, and actuate the terminal 152 to communicate the notification to the user 106 through the user interface 110. Notifications generated by the computing device 122 as an alarm system may indicate a variety of circumstances regarding the cargo 104 to the user 106, including the package 112 and the first transport 120 in transit or storage with the cargo 104.

For example, in a set of circumstances where the cargo 104 is in transit or storage along the route 200, the computing device 122 has executed a smart contract governing the cargo 104, and then the computing device 122 determines that a predetermined condition or an associated condition is not met based on the detected real-time conditions of the cargo 104, the computing device 122 generates an alarm through the user interface 110, the first transport 120, or the remote server 224, where the alarm indicates the unmet predetermined condition or the unmet associated condition to the user 106, another user among the plurality of users, an operator of the first transport 120, or an operator of another transport included in the plurality of transports 212. In this manner, the computing device 122 generates the alarm through the user interface 110, the first transport 120, the second transport 210, or the remote server 224 when the sensor data transmitted from the sensor apparatus 114 indicates a value set that exceeds a predetermined threshold, exceeds the bounds of a predetermined range, or otherwise deviates from a predetermined condition or an associated condition in a smart contract. In an embodiment, the computing device 122 generates an alarm to digital addresses included in a smart contract associated with the cargo 104. Alarms generated by the computing device 122 may indicate instructions to refuse delivery of the cargo 104, and may further indicate the cargo 104 has been returned to the sender or diverted to another location, per the contract or per direction given via the user interface 110.

The computing device 122 may determine a rate of change of a condition indicated by the sensor data, and generate an alarm through the user interface 110, the first transport 120, or the remote server 224 based on a present value of the condition indicated by the sensor data, and based on the rate of change of the condition. With this construction, the computing device 122 may generate an alert warning that a condition associated with the cargo 104 may deviate from a condition required by an associated smart contract, based on the sensor data received from the sensor apparatus 114. More specifically, the computing device 122 may determine an estimated time until the detected condition of the cargo 104 deviates from the required condition, and alert the user 106 or the first transport 120 of the estimated time.

The computing device 122 may additionally or alternatively generate alerts or series of alerts when the sensor data indicates a condition associated with the cargo 104 approaching a threshold defined by the smart contract. In such an embodiment, the series of alerts may become increasingly engaging to the user 106. For example, the computing device 122 may cause the user interface 110 to output a first alert including a visual notification indicated on the display when the detected condition associated with the cargo 104 reaches a first threshold proximal a required threshold. The computing device 122 may additionally cause the user interface 110 to output a second alert including an audio notification when the detected condition reaches a second threshold that is between the first threshold and the required threshold. The computing device 122 may additionally cause the user interface 110 to output a third alert including both an audio notification and a visual notification when the detected condition reaches a third threshold that is between the second threshold and the required condition, where the audio notification or the visual notification includes a greater intensity in sound or brightness than the first notification or the second notification.

Methods for Operating the Monitoring System

Figure 3:
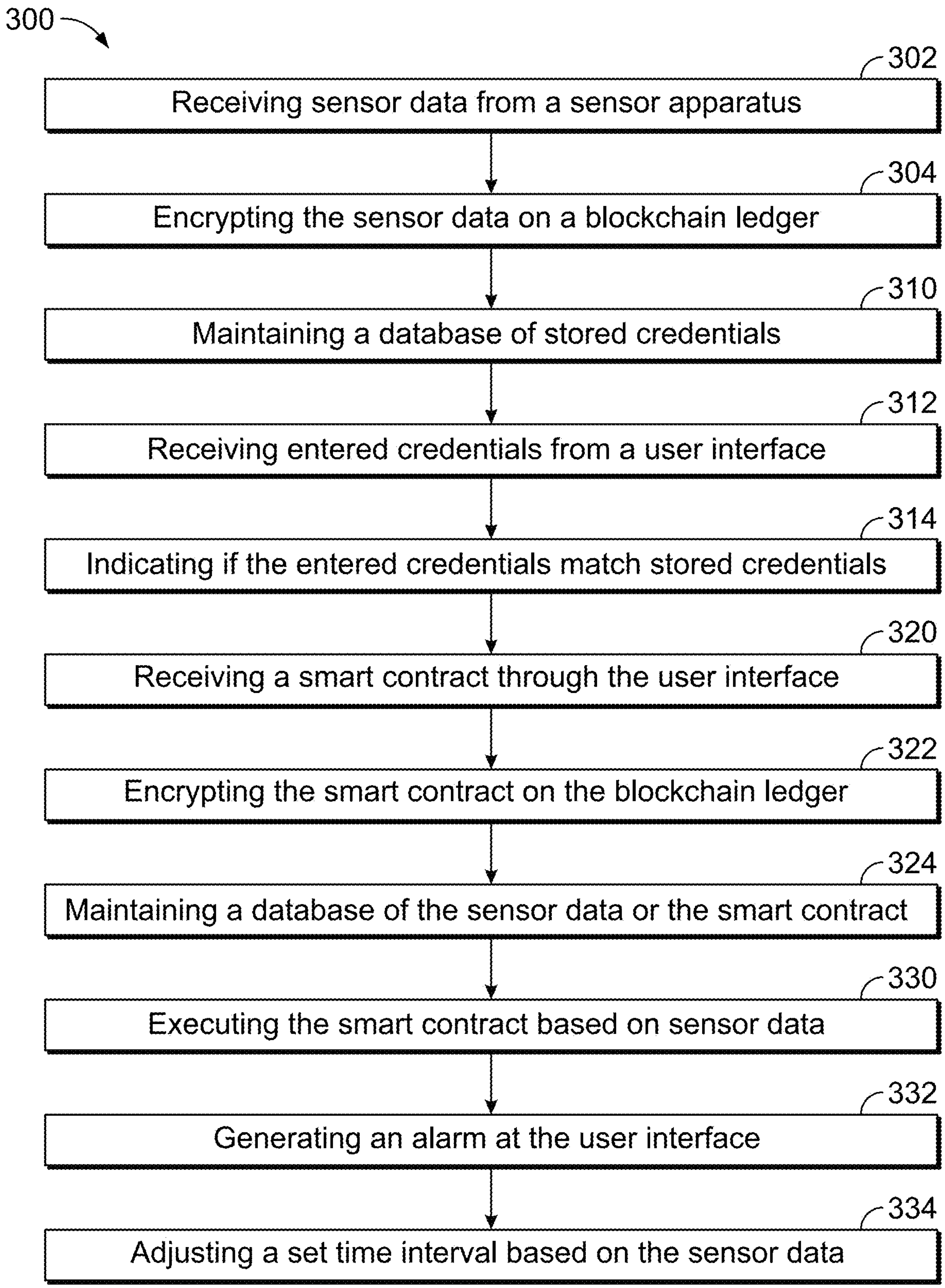
FIG. 3 is an exemplary process flow executed by the monitoring system for tracking cargo as part of a supply chain.

Referring to FIG. 3, a computer-implemented method 300 for monitoring supply chain inventory with the monitoring system 102 will be described according to an exemplary embodiment. FIG. 3 will be described with reference to FIGS. 1 and 2. For simplicity, the method 300 will be described with reference to a depicted sequence of blocks which respectively correspond to steps in the method 300, but the elements of the method 300 may be organized in different orders, architectures, stages, and/or processes.

Referring to FIG. 3, at step 302, the method 300 includes the computing device 122 receiving the sensor data from the sensor apparatus 114 on the first transport 120. In this regard, the sensor apparatus 114 transmits the sensor data from the first sensor array 154, the second sensor array 160, or the third sensor array 162 on the first transport 120 to the computing device 122 via the network 142.

At step 304, the method 300 includes the computing device 122 encrypting the sensor data on the blockchain ledger. In this regard, the computing device 122 transmits the blockchain ledger among the plurality of nodes 232 to maintain the blockchain ledger in a distributed and decentralized manner.

At step 310, the method 300 includes the computing device 122 maintaining the database of stored credentials associated with the sensor data or information associated with the sensor data. In this regard, the computing device 122 maintains the database of stored credentials in the memory 130, the data store 132, the cloud computing platform 144 or the remote server 224, where the database may be accessed by the processor 124.

At step 312, the method 300 includes the computing device 122 receiving entered credentials from the user interface 110. In this regard, the terminal 152 transmits entered credentials from the user interface 110 to the computing device 122, where the computing device 122 verifies the entered credentials against the database of stored credentials.

At step 314, the method 300 includes the terminal 152 indicating if the entered credentials from the user interface 110 match at least one of the stored credentials in the database. In this regard, the user interface 110 indicates whether entered credentials match stored credentials from the database to the user 106.

At step 320, the method 300 includes the computing device 122 receiving a smart contract from one of the plurality of users such as the user 106. In this regard, for example, the user 106 may transmit smart contract information such as stipulated conditions of the cargo 104 from the terminal 152 through the user interface 110 to the computing device 122.

At step 322, the method 300 includes the computing device 122 encrypting the smart contract on the blockchain ledger. In this regard, the computing device 122 transmits the blockchain ledger, including the smart contract, among the plurality of nodes 232 to maintain the blockchain ledger in a distributed and decentralized manner.

At step 324, the method 300 includes the computing device 122 maintaining a database of the sensor data or smart contracts. In this regard, the computing device 122 may record the sensor data or the smart contracts on the database in the memory 130, the data store 132, the cloud computing platform 144 or the remote server 224, where the database may be accessed by the processor 124.

At step 330, the method 300 includes the computing device 122 executing a smart contract based on the sensor data. In this regard, the computing device 122 automatically executes a smart contract transmitted by the user 106 from the terminal 152, based on conditions stipulated in the smart contract.

At step 332, the method 300 includes generating an alert or an alarm at the user interface 110 that the sensor apparatus 114 has generated the sensor data that deviates from a predetermined condition or an associated condition in a smart contract. In an embodiment, the computing device 122 determines the sensor data is outside of a predetermined range. In this regard, the monitoring system 102 alerts the user 106 regarding a detected condition of the cargo 104 from a location remote to the first transport 120.

At step 334, the method 300 includes shortening a set time interval at which the sensor apparatus 114 transmits the sensor data to the computing device 122 based on the detected real-time condition of the cargo 104. In this regard, the computing device 122 may shorten the set time interval based on a statistical anomaly indicated in the detected real-time conditions, a comparison of the detected real-time conditions to a predetermined threshold, or a comparison of the detected real-time conditions to a condition stipulated in the smart contract.

In an embodiment of the method 300, the smart contract includes associated conditions that are compared to the detected real-time condition of the cargo 104 indicated in the sensor data, and the computing device 122 executes the smart contract when the sensor data meets the associated conditions included in the smart contract. The associated conditions may include an acceptable temperature range that the cargo 104 experiences along all points of a supply chain or a cold chain or cool chain. The temperature range is measured by a temperature sensor apparatus included in the sensor apparatus 114, and is in communication with the computing device 122.

Embodiments of the method described above may include a variety of cargo types as the cargo 104, including cargo that is a medication, a pharmaceutical, a biopharmaceutical, an orthopedic graft such as an allograft, a xenograft, or an autograft, or an orthobiologic material. Cargo 104 may also contain medical goods for transfusion such as red blood cells, plasma, and chemotherapeutics. The supply chain may be considered a cold or cool chain depending on the cargo 104 or terms of the smart contract.

Figure 4:
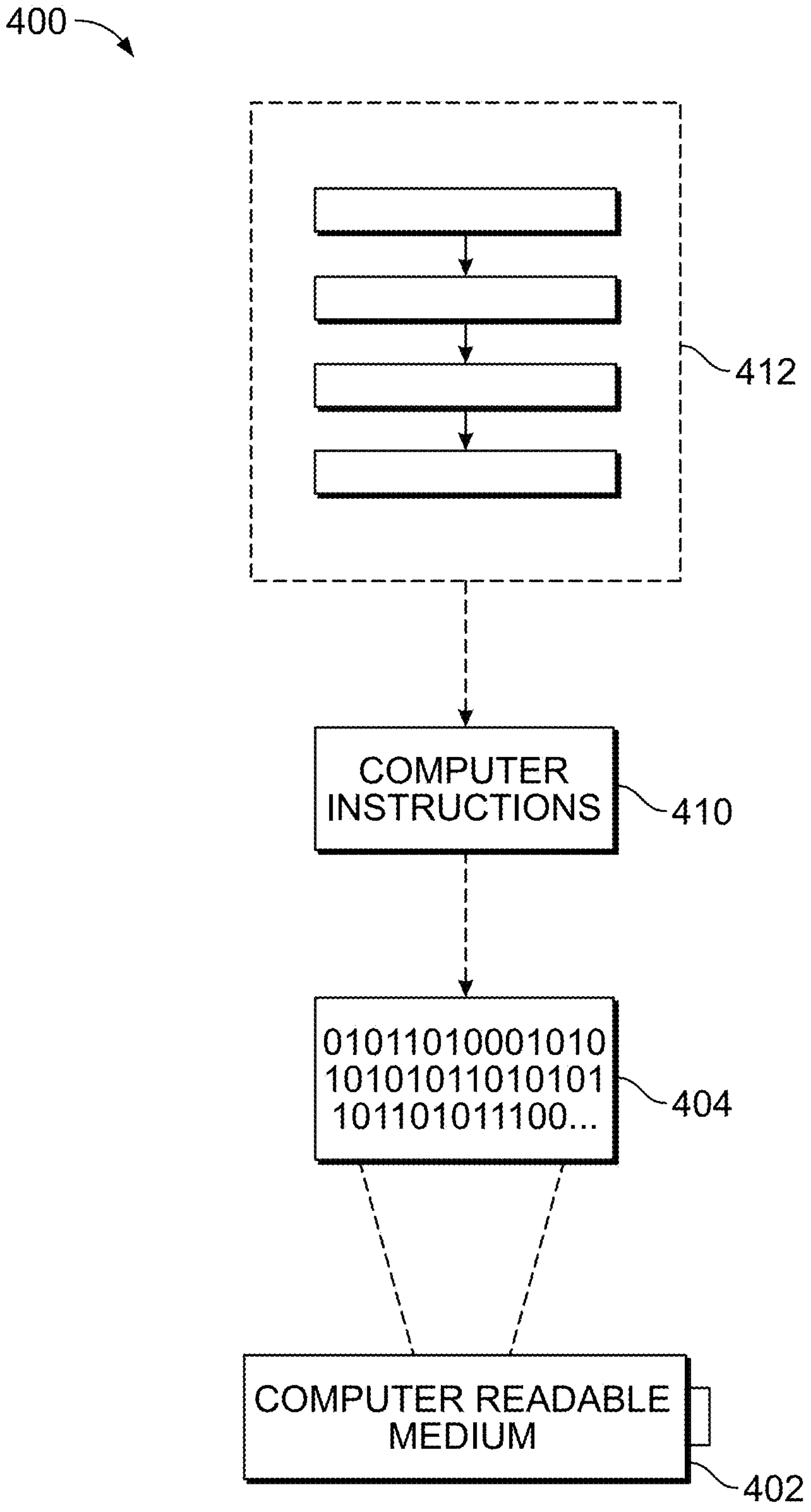
FIG. 4 is an illustration of a computer-readable medium or computer-readable device including processor-executable instructions configured to embody one or more of the provisions set forth herein, according to one aspect.

Still another aspect involves a non-transitory computer-readable medium including processor-executable instructions configured to implement aspects of the techniques presented herein. An aspect of a computer-readable medium or a computer-readable device devised in these ways is illustrated in FIG. 4, where an implementation 400 includes a computer-readable medium 402, such as a CD-R, DVD-R, flash drive, a platter of a hard disk drive, etc., on which is encoded computer-readable data 404. This encoded computer-readable data 404, such as binary data including a plurality of zero's and one's as shown in 404, in turn includes a set of processor-executable computer instructions 410 configured to operate according to one or more of the principles set forth herein. In this implementation 400, the processor-executable computer instructions 410 may be configured to perform a method 412, such as the method 300 of FIG. 3. In another aspect, the processor-executable computer instructions 410 may be configured to implement a system, such as the monitoring system 102 of FIGS. 1 and 2. Many such computer-readable media may be devised by those of ordinary skill in the art that are configured to operate in accordance with the techniques presented herein.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A system that monitors supply chain inventory, the system comprising:

a package that defines an interior environment, includes a refrigeration system, and stores a cargo in the interior environment, the refrigeration system including a relay switch that triggers or halts the refrigeration system;

and at least one computing device that:

receives sensor data transmitted from a sensor apparatus on a transport, wherein the sensor data indicates real-time temperature information associated with the cargo on the transport and the interior environment;

encrypts the sensor data on a blockchain ledger, or stores the sensor data in a hash table;

maintains a database of stored credentials associated with the sensor data or information associated with the sensor data; and compares the sensor data against a threshold or bounds of a range, and generates an alarm to the transport, a remote server, or a user interface associated with at least one of the stored credentials, updates delivery information of the cargo, or adjusts a set time interval at which the sensor apparatus transmits the sensor data when the sensor data exceeds the threshold or the bounds of the range or indicates a statistical anomaly, and actuates the relay switch based on the sensor data when the real-time temperature information exceeds the threshold or the bounds of the range, and based on an executed smart contract associated with the cargo.

2. The system of claim 1, wherein the at least one computing device:

encrypts a smart contract on the blockchain ledger or the hash table;

executes the smart contract when the sensor data indicates the cargo meets a set of conditions; and performs pass through reporting of the sensor data to the user interface at the set time interval based on a parameter included in the set of conditions, defined in the smart contract, and encrypted on the blockchain ledger or stored in the hash table.

3. The system of claim 2, wherein after the smart contract is executed, the at least one computing device:

determines the sensor data does not meet the parameter; and generates the alarm through the user interface, the transport, or the remote server indicating that the sensor data does not meet the parameter, and indicating the updated delivery information, including an updated predetermined destination point of the cargo on the transport.

4. The system of claim 3, wherein the smart contract is a first smart contract associated with an initial predetermined destination point of the cargo on the transport, the at least one computing device executes a second smart contract associated with the updated predetermined destination point, the updated predetermined destination point being a point of disposal of the cargo at a different location from the initial predetermined destination point and a departure point of the cargo.

5. The system of claim 1, wherein the sensor data includes scanned expiration data from an exterior identifier on the package as the sensor data, the at least one computing device checks the expiration data against the threshold, and the at least one computing device generates the alarm at the user interface when the expiration data exceeds the threshold, the threshold being a predetermined amount of time before an expiration date.

6. The system of claim 1, wherein the at least one computing device:

encrypts a smart contract on the blockchain ledger or the hash table;

executes the smart contract when the sensor data indicates the cargo meets a set of conditions;

determines the threshold or the range from a condition defined in the smart contract; and generates the alarm with instructions to refuse delivery of the cargo, or generates the alarm indicating the cargo has been returned to a departure point or diverted to another location when the sensor data exceeds the threshold or the bounds of the range.

7. The system of claim 1, wherein the user interface is stationary as compared to the transport, and communicates with the at least one computing device wirelessly via a network, and the at least one computing device generates the alarm through the user interface, the transport, or a remote server when the sensor data indicates a value set that exceeds the threshold or exceeds the bounds of the range.

8. The system of claim 7, wherein the range is a temperature range associated with the cargo, the sensor apparatus includes a temperature sensor that generates the real-time temperature information associated with the cargo as part of the sensor data, and the at least one computing device checks the sensor data against the range, and generates the alarm when the temperature information exceeds bounds of the temperature range over a set time interval.

9. The system of claim 1, wherein the sensor apparatus includes:

a global positioning satellite (GPS) sensor that generates real-time position information associated with the cargo as the sensor data;

a temperature sensor that generates real-time temperature information associated with the cargo as the sensor data;

a hygrometer that generates real-time humidity information associated with the cargo as the sensor data;

an accelerometer that generates real-time acceleration information associated with the cargo as the sensor data;

a light sensor that generates real-time light intensity information associated with the cargo as the sensor data; or a tilt detector that generates real-time orientation information associated with the cargo as the sensor data; and an electronic lock that generates real-time status information associated with a package containing the cargo as the sensor data.

10. The system of claim 1, wherein the transport includes a cabin and an electronic control unit (ECU), the cargo is stored in the cabin, the sensor apparatus is fixed with a package that contains the cargo inside an interior environment defined by the package, the sensor apparatus generates the sensor data indicating a condition inside the interior environment, and the ECU relays the sensor data from the sensor apparatus at the package to the at least one computing device.

11. The system of claim 1, wherein the transport includes a cabin, the cargo is stored in the cabin, where the cargo is contained in a package having an exterior identifier;

the transport includes a handheld scanner that scans the exterior identifier, linking the scanner to the sensor data encrypted on the blockchain ledger or the hash table, and scans the package or the cargo and generates scanned information; and the at least one computing device generates an alarm indicating the scanned information and the sensor data through the user interface or a remote server.

12. The system of claim 1, wherein the transport comprises at least one of an insulated container, a cryogenic container, a hazardous material container, a dry bulk container, or a tank container that directly contain the cargo.

13. The system of claim 1, wherein the cargo comprises intermediate packaging that directly contact an interior environment of the package and the intermediate packaging comprises at least one of a vial, a box, an ampoule, an intravenous (IV) bag, a blister pack, a chemical canister, a biological sample tube, a sterile medical tray and a cryovial.

14. The system of claim 1, wherein the transport comprises a package that contains the cargo and the sensor apparatus comprises a sensor embedded within the package where the sensor is positioned outside the cargo.

15. The system of claim 1, wherein the transport comprises a package that contains the cargo and the sensor apparatus comprises a sensor disposed in the package so as to occupy and directly contact an interior environment of the package with the cargo.

16. The system of claim 1, wherein the sensor apparatus generates real-time information that indicates a direct condition of the cargo.

17. The system of claim 1, wherein the sensor apparatus indicates a condition of an environment of the package in direct contact with the cargo.

18. The system of claim 17, wherein the condition of the environment comprises a position, a temperature, or a humidity in the environment.

19. The system of claim 1, wherein the cargo comprises a medical good.

20. The system of claim 19, wherein the medical good comprises at least one of a medication, a pharmaceutical, a biopharmaceutical, an orthopedic graft, an allograft, a xenograft, an autograft, blood, plasma, and an orthobiologic material.

21. The system of claim 1, wherein the sensor apparatus comprises a light sensor that generates real-time light intensity information associated with the cargo.

22. The system of claim 1, wherein the at least one computing device:

receives sensor data from a plurality of sensor configurations including the sensor apparatus, wherein each of the sensor configurations is provided on a corresponding transport among a plurality of transports;

encrypts the sensor data from the plurality of sensor configurations on the blockchain ledger, or stores the sensor data in the hash table;

receives entered credentials from a user interface; and indicates the sensor data or information associated with the sensor data through the user interface based on the entered credentials matching at least one of the stored credentials, wherein the stored credentials are individually associated with portions of the sensor data or information associated with the sensor data such that different entered credentials provide different access privileges to the sensor data or information associated with the sensor data.

23. The system of claim 22, wherein portions of the sensor data or information associated with the sensor data indicate a location of the cargo among the plurality of transports relative to a selected location, an origin, a condition, a quantity, or a type of the cargo, a transport identification, whether the cargo among the plurality of transports has been associated with an executed smart contract, or a condition entered at the user interface.

24. The system of claim 1, wherein the at least one computer determines a rate of change of a condition including real-time temperature information or real-time humidity information of the cargo or an environment in direct contact with the cargo, the condition indicated by the sensor data encrypted on the blockchain or stored on the hash table; and generates an alarm through the user interface, the transport, or a remote server based on a present value of the condition indicated by the sensor data, and based on the rate of change of the condition.

25. The system of claim 1, wherein the cargo is a medication, a pharmaceutical, a biopharmaceutical, an orthopedic graft, blood, plasma, or an orthobiologic material, the sensor data indicates real-time information of a direct condition of the cargo, or indicates a condition of an environment in direct contact with the cargo, and the real-time information indicates a position, a temperature, and a humidity of the cargo in the environment.

* * * * *